(12) United States Patent
Abou-Khalil et al.

(10) Patent No.: US 8,373,956 B2
(45) Date of Patent: Feb. 12, 2013

(54) LOW LEAKAGE ELECTROSTATIC DISCHARGE PROTECTION CIRCUIT

(75) Inventors: Michel J. Abou-Khalil, Essex Junction, VT (US); Kiran V. Chatty, Williston, VT (US); Chee Kwang Quek, Sunnyvale, CA (US); Robert J. Gauthier, Jr., Hinesburg, VT (US); Nathaniel Peachey, Oak Ridge, NC (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 12/943,980

(22) Filed: Nov. 11, 2010

(65) Prior Publication Data
US 2012/0120531 A1    May 17, 2012

(51) Int. Cl.
H02H 9/00    (2006.01)
H02H 1/00    (2006.01)
H02H 1/04    (2006.01)
H02H 3/22    (2006.01)
H02H 9/06    (2006.01)

(52) U.S. Cl. .......................................... 361/56; 361/118
(58) Field of Classification Search ...................... 361/56
See application file for complete search history.

(56) References Cited

U.S. PATENT DOCUMENTS

| | | | |
|---|---|---|---|
| 4,716,302 A * | 12/1987 | Flannagan et al. | 327/546 |
| 6,618,233 B1 * | 9/2003 | Russ et al. | 361/111 |
| 6,671,153 B1 | 12/2003 | Ker et al. | |
| 6,768,616 B2 | 7/2004 | Mergens et al. | |
| 6,803,633 B2 | 10/2004 | Mergens et al. | |
| 7,405,435 B2 * | 7/2008 | Sato | 257/173 |
| 7,440,248 B2 * | 10/2008 | Arai et al. | 361/56 |
| 7,525,779 B2 | 4/2009 | Chen et al. | |
| 7,667,243 B2 | 2/2010 | Duvvury et al. | |
| 7,933,107 B2 * | 4/2011 | Sugahara | 361/111 |
| 2003/0016479 A1 * | 1/2003 | Song | 361/56 |
| 2008/0088994 A1 * | 4/2008 | Lai | 361/56 |
| 2008/0239599 A1 | 10/2008 | Yizraeli et al. | |
| 2009/0268359 A1 | 10/2009 | Chatty et al. | |
| 2009/0303644 A1 * | 12/2009 | Barbier et al. | 361/56 |
| 2010/0027173 A1 | 2/2010 | Wijmeersch | |

OTHER PUBLICATIONS

Ker et al., New Diode String Design with Very Low Leakage Current for Using in Power Supply ESD Clamp Circuits, ISCAS 2000—IEEE International Symposium on Circuits and Systems, May 28-31, 2000, Geneva, Switzerland, 1 page.

Fan et al., A Novel Low Voltage Base-Modulated SCR ESD Device with Low Latch-up Risk, 1-58537-175-0 © 2009 ESDA 2A.7 EOS/ESD Symposium 09-109, 10 pages.

Ker et al., Overview of On-Chip Electrostatic Discharge Protection Design With SCR-Based Devices in CMOS Integrated Circuits, IEEE Transactions on Device and Materials Reliability, vol. 5, No. 2, Jun. 2005, pp. 235-249.

Glaser et al., SCR operation mode of diode strings for ESD protection, 2005 EOS/ESD Symposium Copyright 2005 © by ESD Association, 10 pages.

* cited by examiner

*Primary Examiner* — Dharti Patel
(74) *Attorney, Agent, or Firm* — Schmeiser, Olsen & Watts; Michael LeStrange

(57) ABSTRACT

A circuit and method for electrostatic discharge (ESD) protection. The ESD protection circuit includes: a silicon control rectifier (SCR) connected between a first voltage rail and a second voltage rail; one or more diodes connected in series in a forward conduction direction between the first voltage rail and a source of a p-channel field effect transistor (PFET); a drain of the PFET connected to the SCR and connected to ground through a current trigger device; and a control circuit connected to the gate of the PFET.

22 Claims, 5 Drawing Sheets

LOW LEAKAGE ELECTROSTATIC DISCHARGE PROTECTION CIRCUIT

FIELD OF THE INVENTION

The present invention relates to the field of integrated circuits; more specifically, it relates to an electrostatic discharge protection circuit having low leakage.

BACKGROUND

Power supply electrostatic discharge devices and circuits are used to provide a low resistance discharge path for electrostatic discharge (ESD) currents between the power supply lines and grounds of integrated circuits to protect individual circuits connected between the power supply lines and ground from being damaged. The most commonly used ESD device/circuit for power supplies are Resistor-Capacitor (RC)-Triggered Metal Oxide Semiconductor Field Effect Transistor (MOSFET) based clamps. The MOSFET based power supply clamps have high off-state leakage making them unsuitable for use in battery powered integrated circuit applications. Accordingly, there exists a need in the art to mitigate the deficiencies and limitations described hereinabove.

SUMMARY

A first aspect of the present invention is an electrostatic discharge protection circuit, comprising: a silicon control rectifier connected between a first voltage rail and a second voltage rail; one or more diodes connected in series in a forward conduction direction between the first voltage rail and a source of a p-channel field effect transistor; a drain of the p-channel field effect transistor connected to the silicon control rectifier and connected to ground through a current trigger device; and a control circuit connected to the gate of the p-channel field effect transistor.

A second aspect of the present invention is a method of electrostatic discharge protection, comprising: connecting a silicon control rectifier between a first voltage rail and a second voltage rail; connecting one or more diodes in series in a forward conduction direction between the first voltage rail and a source of a p-channel field effect transistor; connecting a drain of the p-channel field effect transistor connected to the silicon control rectifier and to ground through a current trigger device; and connecting a control circuit to the gate of the p-channel field effect transistor.

These and other aspects of the invention are described below.

BRIEF DESCRIPTION OF THE DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION

A direct current (DC) power supply has two terminals. The more positive terminal may be designate VDD and the other terminal may be designated VSS. Thus, VDD is more positive than VSS. In one example VSS is a zero potential or more commonly ground. A positive voltage is a voltage having a potential greater than zero and a negative voltage is a voltage having a potential less than zero. Integrated circuit power supply pads and power supply lines (commonly called power rails) use the same terminology as that of the power supply terminal they are connected to or intended to be connected to. While the terms VDD and VSS will be used in describing the embodiments of the present invention, it should be understood that the terms "positive" may be substituted for VDD and the terms "negative" or "ground" may be substituted for VSS.

There are three general types of electrostatic discharge (ESD) events that have been modeled: the human body model (HBM), the machine model (MM) and the charged device model (CDM). The HBM and MM represent discharge current between any two pins (e.g., pads) on an integrated circuit (IC) as a result of (respectively) a human body discharging through the IC and an electrically conductive tool discharging through the IC. Whereas a human body discharge is relatively slow in terms of rise time and has, for example, a unidirectional current of about 1-3 amps. A tool discharge is a relatively rapid event compared with HBM that, in one example, produces a bi-directional current into and out of the pins of about 3-5 amps. In the CDM, the ESD event does not originate from outside the IC, but instead represents a discharge of a device within the IC to ground (e.g., VSS). The IC is charged through the triboelectric effect (friction charging) or by external electrical fields. The CDM is a very rapid event compared with HBM. ESD events cause high currents to flow through devices of ICs that damage the devices. For example, with field effect transistors, the PN junctions and gate dielectrics can be damaged and interconnects between devices can be damaged.

Figure 1:
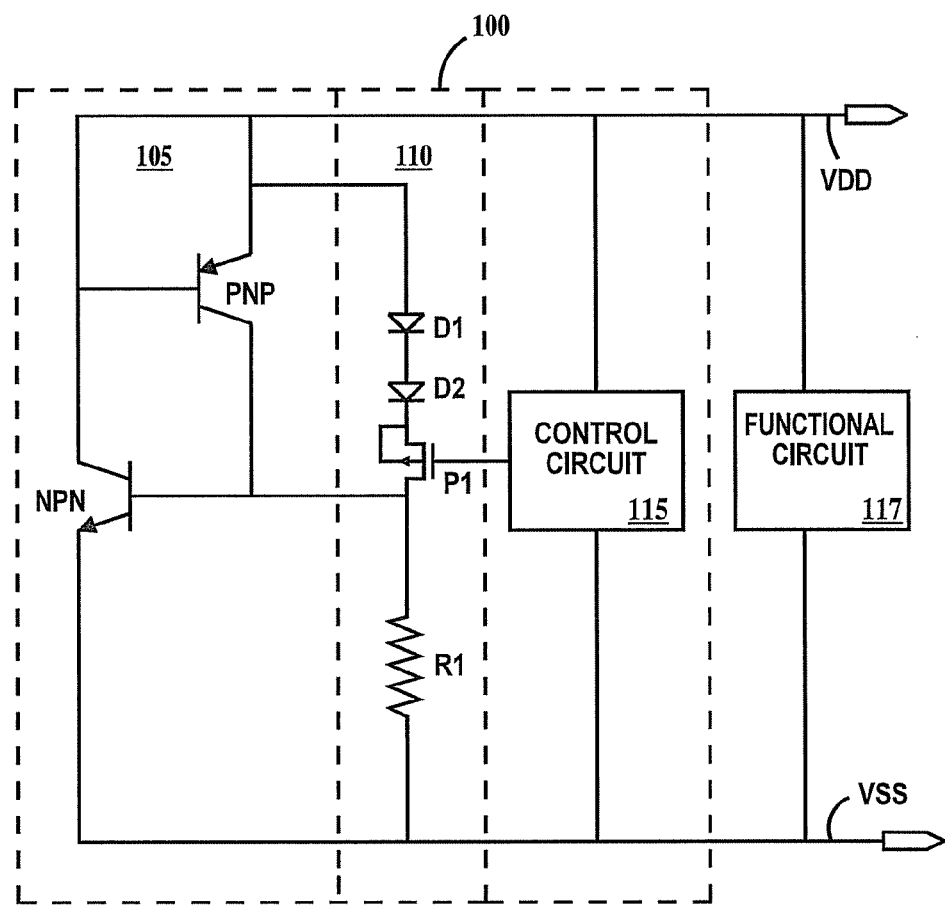
FIG. 1 is a schematic circuit diagram of an electrostatic discharge protection circuit according to an embodiment of the present invention.
Figure 1A:
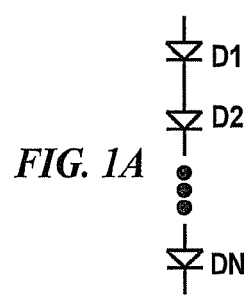

FIG. 1 is a schematic circuit diagram of an electrostatic discharge protection circuit according to an embodiment of the present invention. In FIG. 1, an electrostatic discharge (ESD) protection circuit 100 includes a silicon controlled rectifier (SCR) 105, a trigger circuit 110 and a control circuit 115. SCR 105, trigger circuit 110 and control circuit are each connected between a first power rail VDD and a second power rail VSS. SCR 105 includes a PNP bipolar transistor and a NPN bipolar transistor. Trigger circuit 110 includes first and second diodes D1 and D2, a p-channel field effect transistor (PFET) P1 and a resistor R1. Resistor R1 is used for tuning the trigger current of ESD circuit. The voltage potential of VDD is greater than VSS. In one example, VDD is a positive voltage potential and VSS is ground. The emitter and base of the PNP bipolar transistor, the collector of the NPN bipolar transistor, and the anode of diode D1 are connected to power rail VDD. The emitter of the NPN bipolar transistor is connected to power rail VSS and the drain of PFET P1 is connected to power rail VSS through resistor R1. The collector of the PNP bipolar transistor and the base of the NPN bipolar transistor are connected to the drain of PFET P1. The cathode of diode D1 is connected to the anode of diode D2 and the cathode of diode D2 is connected to the source of PFET P1. The body of PFET P1 is tied to the source of PFET P1. The gate of PFET P1 is connected to an output of control circuit 115. Control circuit 115 is connected between power rail VDD and power rail VSS. While ESD protection circuit 100 is illustrated with two cascoded diodes, there may be n cascoded (connected in series cathode to anode) diodes, where n is a positive integer equal to or greater than 1 as illustrated in FIG. 1A. A functional circuit 117 is connected between power rail VDD and power rail VSS. Functional circuit 117 is a circuit sensitive to ESD events on the VDD power rail. Examples of functional circuits include but are not limited to logic circuits, memory circuits and application specific circuits.

During normal operations, control circuit 115 outputs a high voltage (e.g., a logical 1) and PFET P1 is off. PFET P1 provides a large resistance to current flow when turned off, resulting in a very low leakage. During an ESD event, control circuit 115 outputs a low voltage (e.g., a logical zero) and PFET P1 turns on. PFET P1 provides a low resistance path when it is turned on. ESD current on power rail VDD is initially discharged through the series diodes D1 and D2 plus the internal PN diode (base to emitter) of the bipolar NPN transistor and the bipolar NPN transistor turns on. Turn on of the NPN bipolar transistor provides electron flow to turn on the PNP bipolar transistor. Turn on of the PNP bipolar transistor results in a regenerative feedback turn on of the PNPN (emitter/base/collector-base/emitter) structure of SCR 105.

Figure 2:
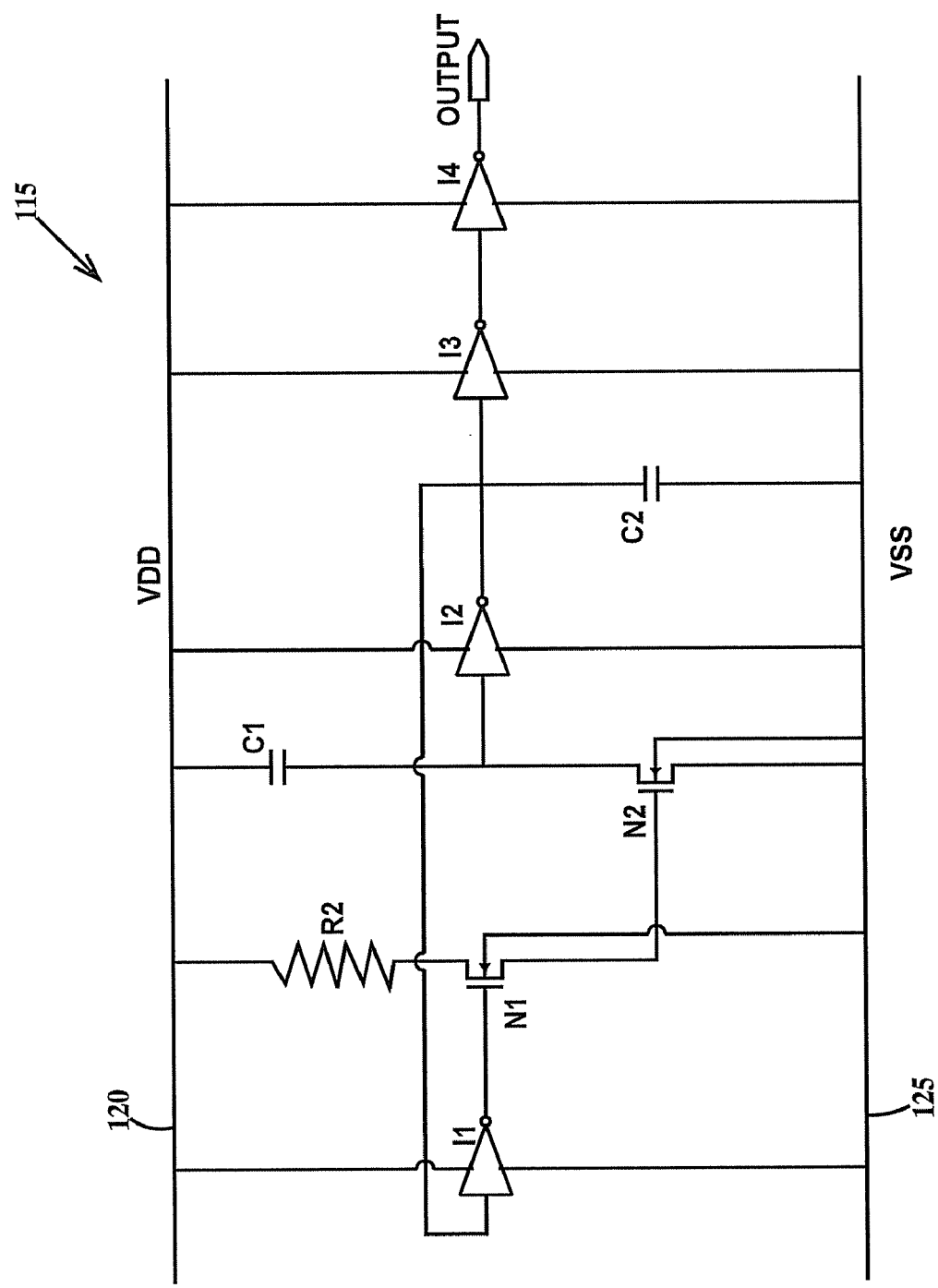
FIG. 2 is a schematic circuit diagram of control circuit 115 of FIG. 1.

FIG. 2 is a schematic circuit diagram of control circuit 115 of FIG. 1. In FIG. 2, control circuit 115 includes capacitors C1 and C2, resistor R2, NFETs N1 and N2 and inverters I1, I2, I3 and I4. Inverters I1, I2, I3 and I4 are powered by power rails VDD and VSS. Power rail VDD is connected to VDD and power rail VSS is connected to VSS. Resistor R2 is connected between power rail VDD and the drain of NFET N1. Capacitor C1 is connected between power rail VDD, the drain of NFET N2 and the input of inverter I2. Capacitor C2 is connected between power rail VSS, the input of inverter I1, the output of inverter I2 and the input of inverter I3. The source of NFET N1 is connected to the gate of NFET N2. The 4 gate of NFET N1 is connected to the output of inverter I1. The source of NFET N2 is connected to power rail VSS. The bodies of NFETs N1 and N2 are connected to power rail VSS. The output of inverter I3 is connected to the input of inverter I4 and the output of inverter I4 is the output of control circuit 115. The output of control circuit 115 is connected to the gate of PFET P1 of FIG. 1. Control circuit 115 is an example of a power on reset circuit.

Figure 3:
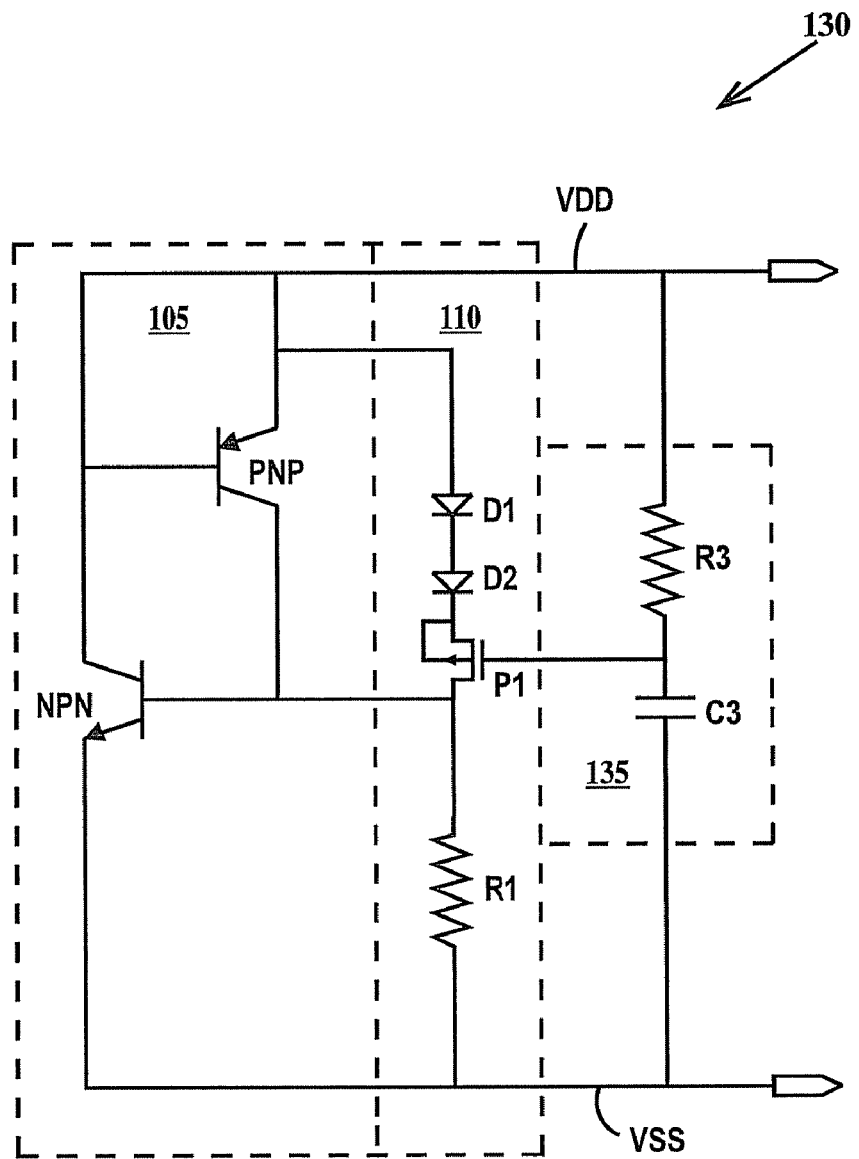
FIG. 3 is a schematic circuit diagram of an electrostatic discharge protection circuit according to an embodiment of the present invention.
Figure 3A:

FIG. 3 is a schematic circuit diagram of an electrostatic discharge protection circuit according to an embodiment of the present invention. In FIG. 3, an ESD protection circuit 130 is similar to ESD protection circuit 100 of FIG. 1 except control circuit 115 of FIG. 1 has been replaced with control circuit 135 in FIG. 3. Control circuit 135 includes a resistor R3 and a capacitor C3. A first terminal of resistor R3 is connected to power rail VDD. A first plate of capacitor C3 is connected to power rail VSS. A second terminal of resistor R3 and a second plate of capacitor C3 are connected to the gate of PFET P1. Control circuit 135 is an example of is an example of a resistor-capacitor (RC) timer. While ESD protection circuit 130 is illustrated with two cascoded diodes, there may be n cascoded diodes, where n is a positive integer equal to or greater than 1 as illustrated in FIG. 3A.

During normal operations, control circuit 135 outputs a high voltage (e.g., a logical 1) and PFET P1 is off. During an ESD event, control circuit 135 outputs a low voltage (e.g., a logical zero) and PFET P1 turns on. Otherwise operation of ESD protection circuit 130 is the same as that of ESD protection circuit 100.

Figure 4:
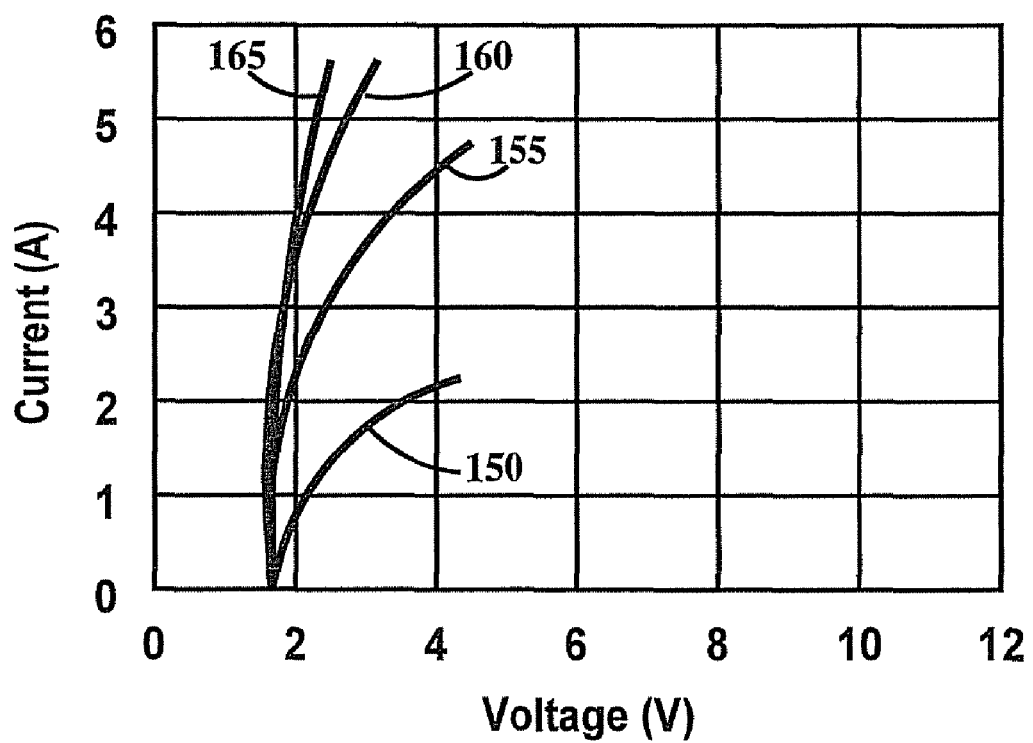
FIG. 4 is a plot of current versus voltage for various electrostatic discharge devices according to embodiments of the present invention.

FIG. 4 is a plot of current versus voltage for various electrostatic discharge devices according to embodiments of the present invention. In FIG. 4, current versus voltage at 100 ns Transmission Line Pulse (TLP) testing is plotted for an ESD protection circuit according to FIG. 1 for various emitter width SCR devices and a same 5-diode cascoded. Curve 150 is for an SCR device with both the NPN and PNP bipolar transistors having emitter widths of 50 μm. Curve 155 is for an SCR device with both the NPN and PNP bipolar transistors having emitter widths of 100 μm. Curve 160 is for an SCR device with both the NPN and PNP bipolar transistors having emitter widths of 150 μm. Curve 165 is for an SCR device with both the NPN and PNP bipolar transistors having emitter widths of 200 μm.

Figure 5:
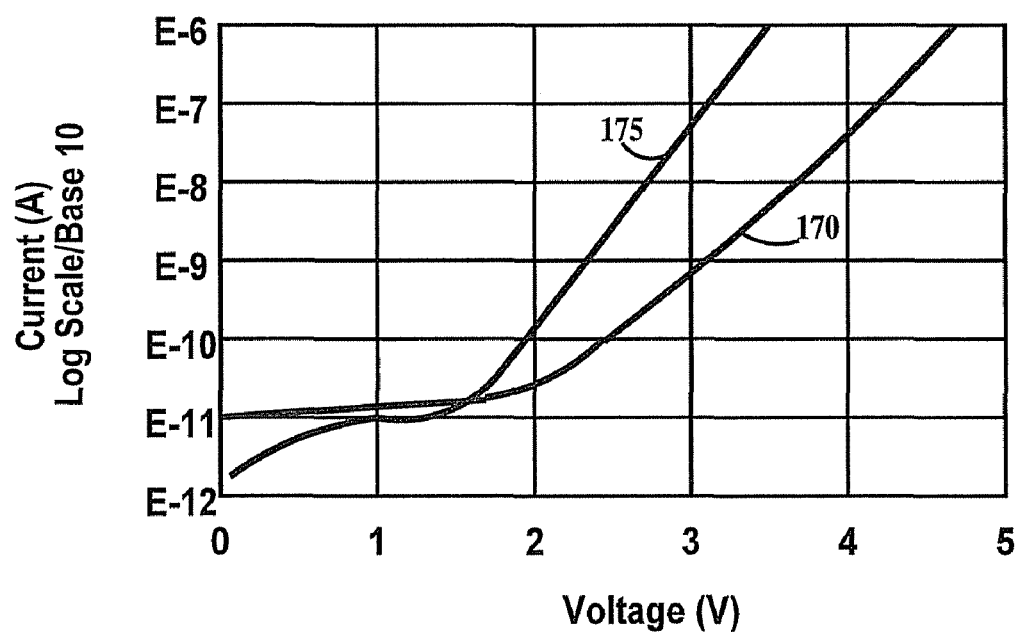
FIG. 5 is a plot of DC leakage current versus voltage comparing the electrostatic discharge protection circuit of FIG. 1 to a similar circuit.

FIG. 5 is a plot of DC leakage current versus voltage comparing the electrostatic discharge protection circuit of FIG. 1 to a similar circuit. In FIG. 5, current versus voltage is plotted for an ESD protection circuit according to FIG. 1 for an SCR device with NPN and PNP widths of 100 μm and a 5-diode cascoded. For curve 170 the gate of PFET P1 (see FIG. 1) connected to control circuit 115 (see FIG. 1). For curve 175 the gate of PFET P1 (see FIG. 1) is connected to VSS. At 3.5 volts, curve 170 has significantly lower leakage than curve 175. The leakage at 3.5 volts and 25° C. is about 3 nA.

In one example, the DC leakage current from the VDD power rail to the VSS power rail through ESD protection circuit 100 (see FIG. 1) is less than or equal to about 3.0 nA at about 3.3 volts or less when PFET P1 (see FIG. 1) is off.

In one example, the DC the leakage current from the VDD power rail to the VSS power rail through ESD protection circuit 130 (see FIG. 3) is less than or equal to about 3.0 nA at about 3.3 volts or less when PFET P1 (see FIG. 3) is off.

Because of the high currents that ESD protection devices must shunt, they must have high currently carrying capacity which means, for bipolar transistors, wide emitter widths. However, high current carrying capacity generally means high leakage, so the combination of high current capacity and low current leakage as obtained by the embodiments of the present invention is generally unexpected result.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. An electrostatic discharge (ESD) protection circuit, comprising:

a silicon control rectifier (SCR) connected between a first voltage rail and a second voltage rail, said SCR comprising a PNP bipolar transistor and an NPN bipolar transistor;

one or more diodes connected in series in a forward conduction direction between said first voltage rail and the source of a p-channel field effect transistor (PFET), the drain of said PFET connected to said second voltage rail through a current trigger device;

a control circuit connected between said first voltage rail and said second voltage rail and connected to the gate of said PFET;

wherein the base of said PNP bipolar transistor is directly connected to said first voltage rail, to the emitter of said PNP bipolar transistor, to the anode of a first diode of said one or more diodes and to the collector of said NPN bipolar transistor;

wherein the base of said NPN bipolar transistor is connected to the drain of said PFET and to the collector of said PNP bipolar transistor; and wherein the emitter of said NPN bipolar transistor is connected to said second voltage rail.

2. The ESD protection circuit of claim 1, further including:
a functional circuit sensitive to electrostatic discharge connected between said first and second voltage rails.

3. The ESD protection circuit of claim 1, wherein said control circuit is configured to turn on said PFET in the event of an ESD event on said first voltage rail.

4. The ESD protection circuit of claim 1, wherein said control circuit comprises a power on reset circuit.

5. The ESD protection circuit of claim 1, wherein said control circuit comprises an RC timer.

6. The ESD protection circuit of claim 1, wherein said current trigger device comprises a resistor.

7. The ESD protection circuit of claim 1, wherein said first voltage rail is more positive than said second voltage rail and wherein the anode of a first diode of said one or more diodes is connected to said first voltage rail and the cathode of a last diode of said one or more diodes is connected to the source of said PFET.

8. The ESD protection circuit of claim 1, wherein said one or more diodes comprises five or more diodes connected in series.

9. The ESD protection circuit of claim 1, wherein a leakage current from said first power rail to said second power rail through said ESD protection circuit is equal to or less than about 3.0 nA at about 3.3 volts or less when said PFET is off.

10. The ESD protection circuit of claim 1, wherein said control circuit comprises a network of invertors, NFETs, resistors and capacitors.

11. The ESD protection circuit of claim 1, wherein said control circuit comprises:

a first capacitor, a second capacitor, a third capacitor, a resistor, a first NFET, a second NFET, a first inverters, a second inverter, a third inverter and a fourth inverter; said first, second and third inverters connected between said first and second power rails, said resistor connected between said first power rail and the drain of said first NFET, said first capacitor connected between said first power rail and the drain of said second NFET N2 and to the input of said second inverter, said second capacitor connected between said second power rail and the input of said first inverter and to the output of said second inverter and to the input of said third inverter, the source of said first NFET connected to the gate of said second NFET, the gate of said first NFET connected to the output of said first inverter, the source of said second NFET connected to said second power rail, the bodies of said first and second NFETs connected to said second power rail, the output of said third inverter connected to the input of said fourth inverter, and the output of said fourth inverter I4 is the output of said control circuit and is connected to the gate of said PFET.

12. A method of electrostatic discharge (ESD) protection, comprising:

connecting a silicon control rectifier (SCR) between a first voltage rail and a second voltage rail, said SCR comprising a PNP bipolar transistor and an NPN bipolar transistor;

connecting one or more diodes in series in a forward conduction direction between said first voltage rail and the source of a p-channel field effect transistor (PFET);

connecting the drain of said PFET to said second voltage rail through a current trigger device connecting a control circuit between said first voltage rail and said second voltage rail and to the gate of said PFET;

directly connecting the base of said PNP bipolar transistor to said first voltage rail;

connecting the base of said PNP bipolar transistor to the emitter of said PNP bipolar transistor, to the anode of a first diode of said one or more diodes and to the collector of said NPN bipolar transistor;

connecting the base of said NPN bipolar transistor to the drain of said PFET and to the collector of said PNP bipolar transistor; and connecting the emitter of said NPN bipolar transistor to said second voltage rail.

13. The method claim 12, further including:
connecting a functional circuit sensitive to electrostatic discharge between said first and second voltage rails.

14. The method of claim 12, wherein said control circuit is configured to turn on said PFET in the event of an ESD event on said first voltage rail.

15. The method of claim 12, wherein said control circuit comprises a power on reset circuit.

16. The method of claim 12, wherein said control circuit comprises an RC timer.

17. The method of claim 12, wherein said current trigger device comprises a resistor.

18. The method of claim 12, wherein said first voltage rail is more positive than said second voltage rail and wherein the anode of a first diode of said one or more diodes is connected to said first voltage rail and the cathode of a last diode of said one or more diodes is connected to the source of said PFET.

19. The method of claim 12, wherein said one or more diodes comprises five or more diodes connected in series.

20. The method of claim 12, wherein a leakage current from said first power rail to said second power rail through said SCR, said one or more diodes, said PFET and said current trigger device is equal to or less than about 3.0 nA at about 3.3 volts or less when said PFET is off.

21. The method of claim 12, wherein said control circuit comprises a network of invertors, NFETs, resistors and capacitors.

22. The method of claim 12, wherein said control circuit comprises:

a first capacitor, a second capacitor, a third capacitor, a resistor, a first NFET, a second NFET, a first inverters, a second inverter, a third inverter and a fourth inverter; said first, second and third inverters connected between said first and second power rails, said resistor connected between said first power rail and the drain of said first NFET, said first capacitor connected between said first power rail and the drain of said second NFET N2 and to the input of said second inverter, said second capacitor connected between said second power rail and the input of said first inverter and to the output of said second inverter and to the input of said third inverter, the source of said first NFET connected to the gate of said second NFET, the gate of said first NFET connected to the output of said first inverter, the source of said second NFET connected to said second power rail, the bodies of said first and second NFETs connected to said second power rail, the output of said third inverter connected to the input of said fourth inverter, and the output of said fourth inverter I4 is the output of said control circuit and is connected to the gate.

* * * * *